United States Patent
Hacke

[15] 3,680,209
[45] Aug. 1, 1972

[54] METHOD OF FORMING STACKED CIRCUIT BOARDS

[72] Inventor: Hans Juergen Hacke, Munich, Germany
[73] Assignee: Siemens Aktiengesellschaft

[22] Filed: April 30, 1970
[21] Appl. No.: 33,255

[30] Foreign Application Priority Data
May 7, 1970 Germany.............P 19 23 199.3

[52] U.S. Cl......................29/625, 29/628, 29/472.3, 156/3, 156/151, 174/68.5, 339/17 R, 317/101 D, 317/101 CM
[51] Int. Cl................................................H05k 3/00
[58] Field of Search............29/625, 626, 627, 472.3; 174/68.5; 339/17 A; 317/101

[56] References Cited

UNITED STATES PATENTS

| | | | |
|---|---|---|---|
| 3,557,446 | 1/1971 | Chanshan | 29/625 |
| 2,889,393 | 6/1959 | Berger | 174/68.5 |
| 2,925,645 | 2/1960 | Bell et al. | 29/625 |
| 2,974,284 | 3/1961 | Parker | 29/625 UX |
| 3,070,650 | 12/1962 | Stearns | 174/68.5 X |
| 3,197,746 | 7/1965 | Stoehr et al. | 2/625 X |
| 3,350,250 | 10/1967 | Sanz et al. | 29/626 X |
| 3,465,435 | 9/1969 | Steranko | 29/625 X |
| 3,499,098 | 3/1970 | McGahey et al. | 29/625 X |
| 3,383,564 | 5/1968 | Lalmond et al. | 29/626 UX |
| 3,501,832 | 3/1970 | Saburo Iwata et al. | 29/626 |
| 3,557,983 | 1/1971 | Hayes et al. | 29/472.3 X |

*Primary Examiner*—John F. Campbell
*Assistant Examiner*—Robert W. Church
*Attorney*—Hill, Sherman, Meroni, Gross & Simpson

[57] ABSTRACT

A circuit board, which has at least two conducting layers separated by interposed insulating layers, having electrical connections through an opening in the insulator layer characterized by the connection having surface-to-surface bond between the conducting layers with a portion of at least one conducting layer deformed into an opening of the separating insulating layer. The circuit board is formed by superimposing a plurality of layers into a stack with the insulating layers between adjacent conducting metal layers. Then heat and pressure are applied to the stack of superimposed layers to force the conducting layers into surface-to-surface engagement and form the bonding of the connection. In the preferred embodiments a filler material such as a metal or metal alloy having a low melting point is provided preferably as a small area coatings on the conducting layers in a pattern corresponding to the pattern of the connections. Complex circuit boards having a large number of conducting layers, can be formed by first forming a core in accordance with the invention and then interposing the core between additional insulating and conducting layers and repeating the heating and pressing step.

10 Claims, 7 Drawing Figures

PATENTED AUG 1 1972

3,680,209

SHEET 1 OF 2

INVENTOR.
HANS-JUERGEN HACKE

BY Hill, Sherman, Meroni, Gross & Simpson
ATTORNEYS

INVENTOR.
HANS-JUERGEN HACKE

BY Hill, Sherman, Meroni, Gross & Simpson
ATTORNEYS

METHOD OF FORMING STACKED CIRCUIT BOARDS

BACKGROUND OF THE INVENTION

1. Field of the Invention

The present invention relates to a circuit board with at least two conducting layers which are separated from each other by an insulating layer and which are connected with each other by an electrical connection at individual points through the insulating layer and to the method of making the circuit board.

2. Prior Art

Circuit boards such as printed circuit boards which have several conducting layers separated by an insulation board are provided with electrical connections at individual points on the circuit paths of the individual conducting layers for electrically interconnecting a circuit path on one side of the insulating layer to the circuit path on the other side. These connecting points usually consist of plated holes in the insulating layer which are formed by boring or punching a hole in the insulating board, treating the hole with an electrical material such as copper and then subsequently plating or galvanically depositing additional electrical conducting material in the hole. Such a method of forming an electrical connection through an insulating layer or board has the disadvantage of requiring expensive processing steps such as boring, treating the bored hole to be platable, and then subsequently electrically plating.

SUMMARY OF THE INVENTION

The present invention provides a circuit board and method of making the circuit board which circuit board has at least two conducting layers separated by an insulating layer and has at least one connection through an opening in the insulating layer for electrically interconnecting two layers. The connection is formed by a surface-to-surface bond between the two conducting layers in which at least a portion of one of the conducting layers has been deformed into the opening of the interposed insulating layer. Preferably a filling material is applied to facilitate forming the bond and in the preferred embodiments the filling material is applied in small spot coatings either electrically or by flame spraying. The conducting layers and the insulating layers are arranged in a stack and then are subjected to heat and pressure to cause the deforming of at least one portion of one of the conductive layers and to form the bond. One embodiment of the invention includes providing a circuit board having a plurality of conducting layers which board is formed by forming a core in the above described manner and then interposing the core between additional insulating and conductive layers and subjecting it to a second heating and pressing step to bond the layers and cores together.

DESCRIPTION OF THE PREFERRED EMBODIMENT

The principles of the present invention are particularly useful in forming the circuit board particularly the circuit board having conductive circuit paths 1*a* and 2*a* on opposite sides of an insulating layer 4 which paths 1*a* and 2*a* are electrically interconnected in predetermined points in the path through the insulating layer 4 by connections 3*a* and 3*a'*. The connections between the circuit paths 1*a* and 2*a* as illustrated in FIG. 2, are surface-to-surface bonds with a portion of the circuit path being deformed toward each other to form the surface contacts of the bond of each connection.

Figure 2:
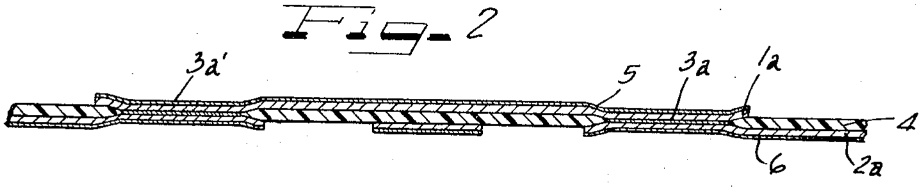
FIG. 2 is a cross section of a circuit board forming the stack of the layers of FIG. 1.

To form the circuit board illustrated in FIG. 2, a pair of conducting layers 1 and 2, which are copper foils, are provided on a surface at discrete and separate areas with layers 3, 3', 3'' and 3''' of a filler material of a metal or metal alloy having a low melting point. The insulating layer 4 which is a foil-like thin material is provided with a pattern of apertures or openings 7 and 8 which are arranged with the same spacing as the layers 3, 3', 3'' and 3'''. A superimposed stack of the conducting layers 1 and 2 and the insulating layer 4 is formed with the layer 4 interposed between the layers 1 and 2 and each of the layers are arranged so that the aperture 7 is aligned with the filler layers 3', 3'' and the aperture opening 8 is aligned with the filler layers 3 and 3'''. The stack of superimposed layers is then pressed together and heated to cause the metal foil forming the conductive layers 1 and 2 to be deformed into the openings such as 7 and to cause fusion of the filler layers such as 3' and 3'' to form a surface-to-surface bond for the electrical connection 3*a'* interconnecting the two conducting layers. The conducting layers are then etched to the desired circuit path configuration with the particular circuit paths 1*a* and 2*a* being determined by a masking layer 5 on the layer 1 and a masking layer 6 on the layer 2. The masking layers are applied to the outwardly facing surfaces of the layers 1 and 2, which surfaces are opposite of the surfaces on which the filler layer was applied.

The insulating layer 4 can be of an adhesive material or of a material coated with adhesive surface layers so that the pressing that occurs during the formation of the electrical connections causes the foils to adhere to the insulating layer. Thus the step of heating and pressing laminates the layers together to form a core or the circuit board assembly illustrated in FIG. 2 which requires only the etching step to provide the desired circuit paths 1*a* and 2*a* from the conducting layers 1 and 2.

As mentioned above, layers of filler material such as 3, are provided to facilitate the surface-to-surface bond between the conducting layers 1 and 2. The filler layers can be electrically plated or galvanically deposited on the conductive or conducting layers 1 and 2 by providing a masking layer having areas free of the masking material which free areas are subsequently covered with a layer of the filler material. The masking layers can be provided by conventional masking techniques such as a screen printing a lacquer masking layer or by conventional photo masking procedures well known in the art.

Instead of galvanically depositing the filler layers 3, 3', 3'' and 3''', they can be applied by a metallizing technique such as flame spraying in which a template is utilized to insure the correct size and location of the individual filler layers such as 3, 3'. Another technique for providing the filler materials is to provide or position forms of the filler material such as metal balls or small discs which are positioned on the layers as they are being stacked or can be attached to one or more of the conducting layers prior to the arranging of the conducting layers and the insulating layers in the superimposed stack.

As mentioned above, the conducting layers 1 and 2 are provided with the etching or etching resistant masking layers 5 and 6 of the desired circuit patterns. Some of the metal filler materials such as tin can be utilized as an etch resistant masking material for certain etching solutions. If the filler material is also capable of acting as a masking material, the masking layers 5 and 6 can be applied to the conducting layers 1 and 2 respectively and simultaneously with the application of the filler layers 3, 3', 3'' and 3'''. The simultaneous applying of the filler layer and masking layer is easily accomplished when electroplating process is used to apply the filler material.

Figure 3:
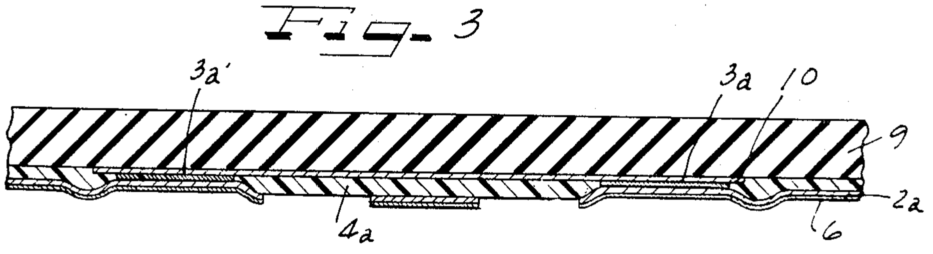
FIG. 3 is an embodiment of the circuit board of FIG. 2, in which one of the conducting layers is mounted on an insulating plate or board.

In the above discussion, both the conductive layers 1 and 2 were thin, deformable metal foils. In the embodiment illustrated in FIG. 3, the circuit board has a substantially rigid insulating plate 9. To form this circuit board, a conductive layer having the predetermined circuit path 10 is attached to a surface of the plate 9. The plate 9 with its conductive layer 10 is superimposed with an insulating layer **4*a* and a metal foil conducting layer having a masking layer 6. The insulating layer 4*a* is provided with the apertures similar to 7 and 8 in a desired pattern for allowing the formation of electrical connections 3*a* and 3*a'* between the foil and conducting layer 10 and the connections are formed by applying heat and pressure to give a surface-to-surface bond between the foil 10 and the portion of the foil overlying the apertures in the insulating layer. Subsequent to the formation of the electrical connections, the foil is etched in those areas not masked by the masking coating 6 to form the desired circuit pattern 2*a*. As in the previous embodiment, filler material was provided at the area of the connections 3*a* and 3*a'* to facilitate the formation of the surface-to-surface bonds. In the embodiment of FIG. 3, the metal foil is easily deformed into the apertures and into surface-to-surface contact with the layer 10 which is substantially rigid due to the backing of the insulating plate 9**.

Figure 4:
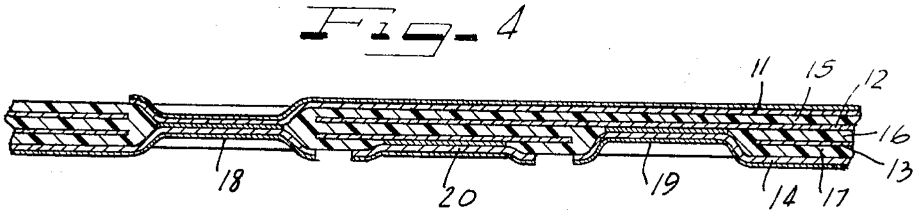
FIG. 4 is a cross section of a circuit board according to the present invention having a plurality of conductive layers separated by insulating layers.

FIG. 4 shows a second embodiment of the circuit board having four conductive or conducting layers 11, 12, 13 and 14, which have the desired circuit paths, with interposed insulating layers 15, 16 and 17. The circuit board has three different types of electrical connections 18, 19 and 20. The connection 18 interconnects the conductive layer 11 to the conductive layer 14 but the connection is insulated from the layers 12 and 13. The connection 19 shows the connection of the layer 12 to the conducting layer 14 which is insulated from the conducting layer 13, and the connection 20 is between the conducting layer 13 and the conducting layer 14.

To form the circuit board illustrated in FIG. 4, the four conducting layers 11, 12, 13 and 14 are superimposed in a stack with the insulating layers 15, 16 and 17 disposed therebetween with each of the insulating layers separating adjacent conducting layers. The insulating layers 15, 16 and 17 are each provided with apertures similar to the aperture 7 and these apertures are in the desired pattern so that they provide the desired pattern of connections. The intermediate two layers 12 and 13 are also provided with apertures which due to the arrangement of the stack are in superimposed and overlying alignment with the apertures in the insulating sheets. Thus the pressing and heating step causes the bending of the layers 11 and 14 into a surface-to-surface contact to provide a surface-to-surface bond for the connection 18. During the bending of the two layers 11 and 14 into the apertures to form the connection 18, the periphery of the apertures of the insulating layers 15, 16 and 17 are molded to insulate the connection 18 from the two intermediate conductive layers 12 and 13.

Figure 1:
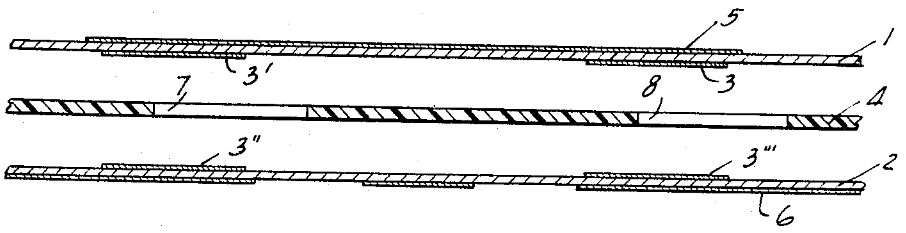
FIG. 1 is an exploded cross section of the layers arranged in a stack in accordance with the present invention.

In forming the connection 19, the insulating layers 16 and 17 have apertures which due to the positioning of the layers in the superimposed stack were aligned with an aperture provided in the conductive layer 13. During the pressing, the foil forming the layer 14 was pressed into the apertures causing surface-to-surface contact with the layer 12 which was not significantly deformed due to the back-up characteristics of the layers 11 and 15. The pressing causes the insulating layers 16 and 17 to be molded to insulate the peripheral edge in the opening or aperture formed in the conductive layer 13 from the connection 19. Finally, the connection 20 was formed in a manner similar to the forming of the connections illustrated in FIGS. 1–3. The insulating layer 17 was provided with an aperture and the layer 14 was deformed into the aperture and into surface-to-surface engagement to form a surface-to-surface bond. As in the previously described cases, filler material may be applied to facilitate the formation of the surface-to-surface bonding.

Figure 5:
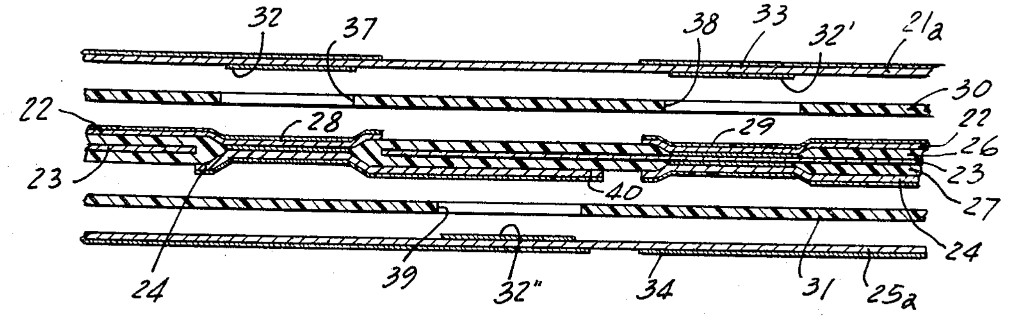
FIG. 5 is an exploded cross sectional view of a plurality of layers and a core member arranged in a stack according to the present invention.
Figure 6:
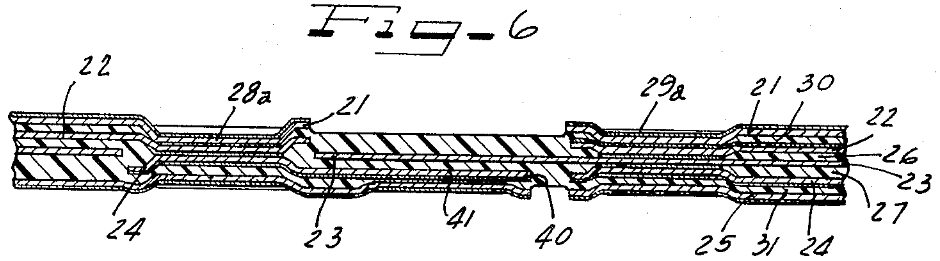
FIG. 6 is a circuit board formed from the stack of FIG. 5.

In the embodiment illustrated in FIGS. 5 and 6, a complex circuit board has five conductive or conducting layers 21, 22, 23, 24 and 25 which have the desired circuit paths and which are separated by insulating layers 26, 27, 30 and 31. Due to the number of layers involved, an intermediate core (FIG. 5) comprising the three conductive layers 22, 23 and 24 with the two interposed insulating layers 26 and 27 is formed by the method described hereinabove. In forming the core formation, a connection 29 which interconnects the three conducting layers was formed and a connection 28 which interconnected the layer 22 with the conducting layer 24 while being insulated from the intermediate conducting layer 23 was formed. After forming the core, the two layers 22 and 24 which were on the exterior of the core were etched to remove the portions of the layers to provide the desired circuit path for the conductive layers. Subsequent to the etching of the core, it was assembled with an additional insulating layers 30 and 31 and conducting layers 21*a* and 25*a*, which are deformable metal foil, to form a second stack of superimposed layers with the insulating layer 30 between the core and foil layer 21*a* and the layer 31 between the core and foil layer 25*a*. In the arrangement of the second stack, the layer 30 has apertures 37 and 38 overlying the connections 28 and 29 respectively, and the foils 21*a* have layers 32 and 32' of filler material aligned with the apertures 37 and 38 respectively. The layer 31 has an aperture 39 overlying a portion 40 of the conductive layer 24 and the foil layer 25*a* has filler material 32'' in alignment with the aperture 40. The foil layers 21*a* and 25*a* are provided with masking layers 33 and 34 respectively.

After the core and the outer layers are arranged in the second stack, pressure and heat are applied to move the layers together and to cause the metal foil layer 21*a* to be joined to the connections 28 and 29 through the apertures 37 and 38 in the insulating sheet 30 to form connections 28*a* and 29*a* respectively. The other outer layer 25*a* is connected to the outer layer 24 of the core at the connecting point 41. Subsequent to forming the connections, the two outer layers 21*a* and 25*a* are etched to provide the circuit paths of the layers 21 and 25.

The circuit board formed by the process has three connections 28*a*, 29*a* and 41. Connection 28*a* interconnects layers 21, 22 and 24. Connection 29*a* interconnects layers 21, 22, 23 and 24 and connection 41 interconnects layers 24 and 25.

Figure 7:
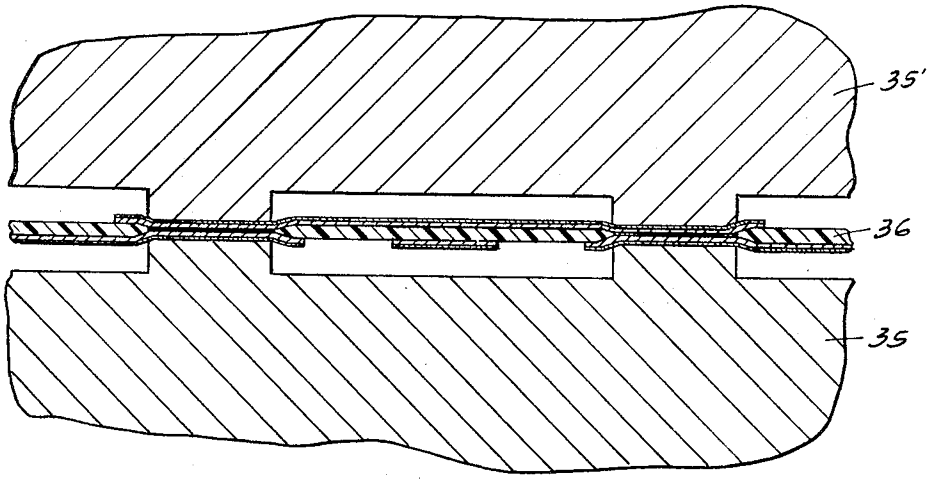
FIG. 7 is a partial cross section of a die or stamp arrangement used in preforming the invention.

In pressing the layers together to form the connections with the surface bonds, it may be desirable to provide a cushioning layer adjacent to one of the metal layers to help concentrate the pressure in an area where the bond is to be formed while cushioning the pressure applied to other areas of the stack. In FIG. 7, dies or pressure plates system for pressing and heating the stack at the desired points for forming the connections is illustrated. A stack 36 of superimposed layers is disposed between a pair of dies 35 and 35', which are each provided with projections for engaging selected areas of the stack 36 which areas are at the points where connections are to be formed. The projections on the dies can be arranged in an array or pattern which is desirable for the formation of the pattern of connections for a circuit board arrangement. The dies 35 and 35' can be heated by conventional means such as electrical coils. By localizing the area of the stack receiving the pressure and heat by using the heated dies 35 and 35', a filler material can be used to form the connection even though the melting point is at a range that would cause damage to the insulating material.

To facilitate the desired alignment of the insulating and metal foils when arranged in a stack, the various layers can be provided with aligning holes at their edges which can be formed at the same time as the other apertures are formed. The apertures and aligning holes can be formed by punching, cutting or etching.

The insulating sheets such as 4 used between the metal conducting layers 1 and 2 are relatively thin and flexible. Thus the circuit boards illustrated in FIGS. 2 and 6 are flexible circuit boards which flexibility may be a desirable feature in the ultimate use of the board. If a rigid circuit board is desired, one of the conducting layers can be carried on a rigid insulating board (FIG. 3) to provide a rigid circuit board construction.

The present invention is particularly adapted in the production of a circuit board having several levels or layers of conductive wiring paths in which a lamination process is necessary even in the prior art type of assembly. In such an arrangement the inner layers can be formed as a core and a second stage of process steps is used to apply the outer layers. Due to the use of apertures in the insulating layers and the small layers of bonding material such as the tin filler or solder, the process is particularly adapted for making circuit board for miniature circuits.

Although minor modifications might be suggested by those versed in the art, it should be understood that I wish to embody within the scope of the patent warranted hereon all such modifications as reasonably and properly come within the scope of my contribution to the art.

I claim:

1. A method of forming a circuit board arrangement having at least two conducting layers separated by an interposed insulating layer, the conducting layers having at least one connection through the insulating layer for electrically interconnecting portions of the conducting layers, the method comprising the steps of providing at least one insulating layer and at least two metal conducting layers, at least one of the conducting layers being a deformable metal foil and at least one of said insulating layers having at least one opening extending therethrough:

applying a layer of filler material to selected areas of a surface of the conducting layers to facilitate the forming of the surface-to-surface bond, and simultaneously applying to the opposite surface of said layers, a masking coating of etch resistant material in a predetermined pattern to provide exposed areas;

arranging the layers in a superimposed stack with an insulating layer interposed between adjacent conducting layers to separate adjacent conducting layers and with the filler material disposed at each of said openings;

applying pressure and heat to the stack to press the superimposed layers together to form a core, to force a portion of the metal foil into the openings of the interposed insulating layer to contact the adjacent conducting layer and to melt the filler material to form a surface-to-surface bond between the conducting layers for the connection;

etching the exposed areas of the conducting layers to form the desired electrical circuit patterns from each masked conducting layer;

providing an additional insulating layer and outer conducting layer of a deformable metal foil, said insulating layer having at least one opening formed therein;

overlying said additional insulating layer and the deformable metal foil on one of the etched circuit patterns of the core with the opening of the additional insulating layer overlying a portion of the circuit pattern to form a second stack; and applying heat and pressure to said second stack to cause the second stack to adhere together and to force a portion of the outer conducting layer into the opening of the additional insulating layer and into contact with the etched circuit pattern for forming an electrical connection having a surface-to-surface bond therebetween.

2. A method of forming a circuit board arrangement having a plurality of conducting layers with an interposed insulating layer disposed between each adjacent conducting layer to electrically separate said conducting layers, said circuit board having electrical connections for interconnecting various conducting layers together through the interposed insulating layers, said method comprising the steps of:

providing at least two metal conducting layers and at least one insulating layer, said metal conducting layers being a deformable metal foil and said interposed insulating layer having at least one opening therethrough, arranging the layers into a stack with an insulating layer disposed between adjacent conducting layers and with filler material located at each opening;

applying heat and pressure to the stack to press the layers together to form a core of the layers, to force a portion of each metal layer into the openings in the insulating layer and to melt the filler material to form the surface-to-surface bond between the conducting layers to form an electrical connection;

etching the conducting layers to provide the desired electrical circuit paths;

providing additional electrical conducting layers and insulating layers, some of said conducting layers being deformable metal foil and the insulating layers having openings in predetermined patterns thereon;

arranging the additional layers on either side of the core to form a second stack, with the insulating layers interposed between conducting layers to electrically separate them, and applying heat and pressure to the second stack to press the core and layers together to form the circuit board and to cause the surface-to-surface bonding of the conducting layers through the openings in the additional insulating layers to the conducting layers of the core to provide a circuit board having a plurality of conducting layers separated by insulating layers with electrical connections between conducting layers.

3. A method according to claim 2, wherein said filler material is galvanically deposited at predetermined areas on the conducting layers by covering the conducting layer with a masking layer of material preventing galvanic depositing in a pattern leaving the desired areas free from said masking layer and galvanically depositing said filler material in the free areas.

4. A method according to claim 2, wherein said filler material is a layer deposited at the desired area on the conducting layers by placing a template over the surface of the conducting layer and flame spraying the layer of filler material through the template on to the conducting layer.

5. A method according to claim 2, wherein a filler material in the form of small pieces is inserted in the superimposed stack at the point where the connection is to be formed.

6. A method according to claim 2, wherein the step of applying heat and pressure includes applying the heat and pressure at selected areas of the superimposed stack which areas overlay the point where the connection is to be formed.

7. A method according to claim 2, wherein one of the conductive layers is carried on a substantially rigid insulating plate and is formed by the steps of applying a conducting layer to the insulating plate, and etching a circuit pattern therein.

8. A method according to claim 2, wherein the providing of filler material includes the steps of applying a layer of filler material to selected areas of a surface of the conducting layers to facilitate the forming of the surface-to-surface bond, and simultaneously applying to the opposite surface of said layers, a masking coating of etch resistant material in a predetermined pattern.

9. A method of forming a circuit board arrangement having at least three conducting layers separated by interposed insulating layers the conducting layers having at least two connections through the insulating layers for electrically connecting at least two conducting layers together, said method comprising the step of:

providing metal conducting layers and insulating layers, at least one of the metal conducting layers being an intermediate conducting layer having an opening formed therein, at least two of the conducting layers being of a deformable metal foil, and said insulating layers having openings formed therein in a predetermined pattern;

arranging the layers in a superimposed stack with the opening in the intermediate layer being in overlying alignment with openings in each of the adjacent insulating layers, said stack being arranged with an insulating layer interposed between adjacent conducting layers; and applying heat and pressure to press the layers of the stack together to form a core and to deform a portion of the foil on the outer layers through the aligned openings of the insulating layer and the intermediate conducting layer to form an electrical connection having a surface-to-surface bond between the outer two conducting layers with the deforming of the foil causing molding of the insulating layer to electrically insulate the connection from said intermediate conducting layer.

10. A method according to claim 9, wherein said insulating layers each contain at least one second opening and wherein the step of arranging the stack includes aligning the second openings in super-imposed alignment so that the step of heating and pressing the stack forms an electrical connection between both the outer conducting layers and the intermediate conducting layers at the same position.

* * * * *